United States Patent Office 3,427,246
Patented Feb. 11, 1969

3,427,246
TRITHIONE-TERVALENT PHOSPHORUS REACTION PRODUCT AND LUBRICATING OIL CONTAINING SAME
Donald J. Anderson, San Anselmo, Calif., assignor to Chevron Research Company, San Francisco, Calif., a corporation of Delaware
No Drawing. Filed Sept. 28, 1966, Ser. No. 582,495
U.S. Cl. 252—46.6                         10 Claims
Int. Cl. C10m 1/38, 3/32; C07d 61/00

ABSTRACT OF THE DISCLOSURE

Reaction products of phosphorus esters and trithiones are obtained by contacting the 2 materials under mild conditions. The products find use as additives in lubricating oils.

This invention concerns novel compositions which find use as detergents, oxidation inhibitors and antiwear agents, the method of their preparation, compounds derivable from the composition, the process for making the compositions and compounds, and the use of the compositions and compound in liquid lubricants.

The lubricants, oils and greases used in internal combustion engines, as well as in the protection of other apparatuses having moving parts, are subjected to severe thermal and oxidative conditions. Also, the stresses at the surfaces of the moving parts are quite severe, and fretting, abrasion, corrosion and other destruction due to wear occur. Therefore, numerous additives are included in lubricants to reduce or prevent the destruction of the lubricant and wear of the moving parts.

It has now been found that excellent lubricant additives which confer a spectrum of desirable properties on the lubricant can be obtained by combining at elevated temperatures a trivalent phosphorus compound with a trithione, usually hydrocarbyl substituted, and removing, if desired, the resulting phosphorothioate by-product from the reaction mixture.

Without indicating what the reaction products are, the reaction is as follows:

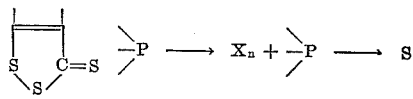

wherein X indicates the products of the reaction and $n$ indicates that one or more products is obtained.

The reaction is carried out either neat or in the presence of an inert solvent, at a temperature of at least 50° C. and generally in the range of about 75° to 180° C. Preferably, the reaction is carried out at a temperature in the range of 110° to 150° C.

The time for the reaction is usually at least about 10 minutes and more usually in the range of 30 minutes to 12 hours. The course of the reaction can be followed spectrally, and when the desired degree of reaction has been achieved, the reaction is stopped and the product worked up.

The pressure for the reaction is not critical, usually being at or above the vapor pressure of the reactants and solvent, if present. Autogenous pressure or atmospheric pressure is generally employed.

Ordinarily, an inert atmosphere will be used, e.g., nitrogen. Although oxygen may be present, it apparently diminishes the yield, and it is, therefore, preferable to carry out the reaction in the absence of oxygen.

The reaction may be carried out batchwise or continuously.

At least 2 moles of the trivalent phosphorus compound will be used per mole of trithione. Usually from about 2 to 10 moles, more usually from about 3 to 8 moles of the trivalent phosphorus compound will be used per mole of trithione.

Various inert solvents may be used, particularly aromatic hydrocarbon solvents of from 6 to 10 carbon atoms, more usually of from 7 to 8 carbon atoms. By choosing the proper solvent, the refluxing of the solvent can be used for temperature control. Illustrative solvents are benzene, toluene, xylene, cumene, tert.-butyl benzene, etc. Individual or mixed solvents may be used as desired. Preferably, the reaction is carried out in the absence of solvent.

The concentration of the reactants when a solvent is used may be varied widely. Usually, the reactants will be in from about 5 to 80 weight percent of the reaction mixture.

At the conclusion of the reaction, when the product is higher boiling than the phosphorothioate, the product may be readily isolated by distilling out in vacuo any volatile material. In some instances, it may be desirous to retain the phosphorothioate with the other reaction products. As desired, the reaction product may be treated with various solvents and adsorbing agents, may be fractionated by chromatography or purified by other convenient means.

The product obtained frequently has an offensive odor which is significantly ameliorated by blowing air through the product at ambient or mildly elevated temperatures for from 1 to 24 hours. Extraction with solvents such as aqueous ethanol, or subjecting the product to a high vacuum is also found to be effective.

It is found in some instances that if the reaction product is allowed to cool, upon standing, a crystalline material may be isolated which may then be purified by recrystallization from a suitable solvent. The crystalline product, from its physical characterization, is presumed to have the following structure:

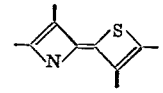

wherein the substituents on the ring are those which were present on the trithione.

The individual reactants will now be considered. The trithiones which find use in this invention may be of from about 3 to 200 carbon atoms, more usually of from about 4 to 150 carbon atoms.

The trithiones will generally have the following formula:

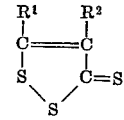

wherein $R^1$ and $R^2$ may be the same or different and are hydrogen or hydrocarbyl. (Hydrocarbyl is a monovalent organic radical composed solely of carbon and hydrogen which may be aliphatic, alicyclic or aromatic, or combinations thereof, e.g., aralkyl. Hydrocarbyl may be aliphatically saturated or unsaturated, e.g., olefinic.) Normally, $R^1$ and $R^2$ will be relatively free of aliphatic unsaturation, i.e., acetylenic and olefinic.

$R^1$ and $R^2$, when hydrocarbyl, will generally be of from 1 to 199 carbon atoms. Usually, one of $R^1$ and $R^2$ will be lower alkyl, i.e., alkyl of from 1 to 6 carbon atoms, and the other will be a long chain hydrocarbon radical. The preferred long chain hydrocarbon radicals are derived from polyisobutylene, particularly polyisobutylene of from 12 to 124 carbon atoms.

Depending on utility, preferred groups of compounds will have $R^1$ and $R^2$ having a total number of carbon atoms in the range of 0 (when both $R^1$ and $R^2$ are hydrogen, and 1 when one of $R^1$ and $R^2$ is hydrocarbyl) to 27 or 22 to 97. The preferred groups will be discussed more thoroughly subsequently.

Illustrative hydrocarbon radicals include phenyl, benzyl, naphthyl, methyl, ethyl, tert.-butyl, neopentyl, cyclohexyl, cyclopentyl, phenethyl, tolyl, polyisobutenyl, polypropenyl, etc.

Trithiones are well known in the art and are readily prepared by contacting at elevated temperatures with sulfur an olefinic compound having the following functionality:

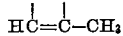

Numerous other methods are also available for preparing trithiones from other starting materials, e.g., ketones. See Landis, Chem. Rev. 65 237 (1965).

Various olefins which may be used to prepare the trithiones include isobutylene, diisobutylene, triisobutylene, tetraisobutylene, 2 - methyl - 2 - butene, 2,4,4 - dimethylpentene, tetrapropylene, pentapropylene, 2-octene, etc.

The phosphorus compounds which find use may be any trivalent phosphorus compounds whose substituents do not interfere with the reaction of the phosphorous and the trithione. While derivatives of phosphenous acid, phosphinous acid, phosphonous acid and phosphorus acid may be used, particularly the esters, usually trihydrocarbyl phosphites will be used, particularly hydrocarbyl of from 1 to 6 carbon atoms. When little, if any, of the phosphorus compound is to remain in the final reaction product, usually the simplest and most economic phosphorus compound will be used in the reaction. This compound will ordinarily be a tri-lower alkyl phosphite, particularly trimethyl and triethyl phosphite.

The phosphorus compound will ordinarily have the following formula:

$$(R^3[X]_m)_2 P[X]_m^1 R^4$$

wherein X is oxygen, $R^3$ is hydrocarbyl, generally of from 1 to 12 carbon atoms, more usually of from 1 to 6 carbon atoms and preferably of from 1 to 2 carbon atoms, $R^4$ is hydrogen or hydrocarbyl of from 1 to 12 carbon atoms, more usually of from 1 to 6 carbon atoms and preferably of from 1 to 2 carbon atoms, $m$ and $m^1$ are integers of from 0 to 1, preferably 1. Usually, $R^4$ will be hydrocarbyl when $m^1$ is 1.

Illustrative trivalent phosphorus compounds are trimethyl phosphite, triethyl phosphite, triphenyl phosphite, dimethyl phenylphosphoroite, diphenyl methylphosphenoite, etc.

The complex reaction product finds a variety of uses. While its composition is not known, one of the components can be isolated as a crystalline solid. From its spectral properties, as well as other physical properties, its structure is believed to be as follows:

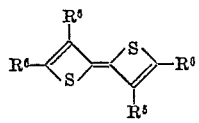

wherein $R^5$ and $R^6$ are analogous to $R^1$ and $R^2$ of the trithione. Therefore, $R^5$ and $R^6$ are usually hydrocarbyl as previously defined for $R^1$ and $R^2$; however, one of $R^5$ and $R^6$ may be hydrogen.

When triisobutylene trithione is used in the reaction with the trivalent phosphorus compound, the product is believed to be of the above formula, wherein $R^6$ is tert.-butyl, while $R^5$ is neopentyl. This compound, as well as its homologs and analogs is believed to be the first known example of a bis-thietenylidene.

The compositions of this invention may be formulated with various lubricating fluids (hereinafter referred to as oils) which are either derived from natural or synthetic sources. Oils generally have viscosities of from about 35 to 50,000 Saybolt Universal seconds (SUS) at 100° F. Among natural hydrocarbonaceous oils are paraffin base, naphthenic base, asphaltic base and mixed base oils. Illustrative of synthetic oils are: hydrocarbon oils such as polymers of various olefins, generally of from 2 to 8 carbon atoms, and alkylated aromatic hydrocarbons; and nonhydrocarbon oils, such as polyalkylene oxides, aromatic ethers, carboxylate esters, phosphate esters, and silicon esters. The preferred media are the hydrocarbonaceous media, both natural and synthetic.

The above oils may be used individually or together whenever miscible or made so by the use of mutual solvents.

Depending on the particular use of the compositions of this invention, the amount employed will vary; also, whether the compositions are present in a concentrate or in a composition to be used for lubrication.

When the compositions are to be used as detergents, they will be present in at least about 0.1 weight percent and generally from about 1 to 15 weight percent. Because of the compatibility with oil, concentrates can be prepared having as high as 80 weight percent, generally in the range of 15 to 75 weight percent.

When the compositions are to be used as antioxidants or as extreme pressure agents, the amount will generally vary from about 1 to 10 weight percent. A preferred aspect of this invention is to use the compositions of this invention in combination with amine containing detergents. The detergents generally have a long chain hydrocarbon group, usually polyisobutylene of from 30 to 200 carbon atoms bonded to an alkylene polyamine of from 2 to 6 amine nitrogen atoms and from 2 to 15 carbon atoms. The hydrocarbon group may be connected to the amine group in a variety of ways. These include by direct bonding, by a succinoyl group to form a succinimide or by an imidazoline group prepared by the reaction of a carboxylic acid or trithione with an alkylene polyamine having an ethylene diamine terminal group.

The following examples are offered by way of illustration and not by way of limitation.

EXAMPLE A

Exemplary preparation of trithione

Into a reaction flask was introduced 160 g. (5 g. atoms) of sulfur and 260 g. (1 mole) of 4-neopentyl-5-tert.-butyl-1,2-dithiole-3-thione and heated under nitrogen to 200° C. To the mixture was then added, over a period of 1 hour, 900 g. (1 mole) of polyisobutylene, and the reaction mixture maintained at the same temperature for a further 12 hours.

Volatile material was then removed by distillation with a pot temperature of 210° C. at a pressure of 4 to 5 mm. Hg.

Analysis percent.—S, 7.99, 7.92.

EXAMPLE I

Into a reaction flask was introduced 130 g. (0.5 mole) of triisobutylene trithione and 372 g. (3.0 moles) of trimethyl phosphite and the mixture heated for 24 hours at 40° C. At the end of this time, the temperature was raised to 120° C. and maintained for 4.5 hours followed by slowly increasing the temperature to a final temperature of 155° C. over a period of 4 hours.

On cooling, a solid crystalline material separated which was isolated and weighed 5.9 g. Upon recrystallization from n-hexane, 2 g. of white rectangular needles was obtained. Melting point 179° to 181° C.

Analysis. Mol. wt. (ThermoNAM), 384, theory, 392; ionization potential by mass spectrometer, 6.8 e.v., parent peak m./e., 392; U.V., λ max. —281 mμ, ε—1.65×10⁴ (hexane); percent S, 16.1; theory, 16.3. The product was tested in a lubricating oil and found to have antioxidant properties.

EXAMPLE II

Into a reaction flask was introduced 100 g. (0.07 mole) of polyisobutylene trithione (approximately 1100 molecular weight), and 62 g. (0.5 mole) of trimethyl phosphite, and the mixture heated at 110° C. with stirring for 4 hours. At the end of this time, the mixture was heated to 120° C. at a pressure of 0.3 mm. Hg and volatile materials removed. Toluene was then added to the residue and the solution distilled, finally achieving a pot temperature of 150° C. at a pressure of 0.3 mm. Hg. The residue weighed 75 g. (A small sample had been removed during the course of the reaction.)

*Analysis percent.*—S, 5.65, 5.60; P, 0.6.

Numerous other reaction products were prepared using a variety of trithiones and trimethyl phosphite following the conditions of Example II. These materials were tested under a variety of conditions to demonstrate their effectiveness in conferring a number of desirable properties to lubricants, particularly lubricating oils.

The compositions were tested as antioxidants by the Oxidator B test, as anticorrosive agents by the L–38 Strip test, as extreme pressure agents by the Falex extreme pressure test, and as detergents in a Caterpillar 1–G test. An exemplary composition was also tested in combination with a commercial detergent as an oxidation inhibitor.

Descriptions of the various tests are as follows:

Oxidator B Test.—To 25 g. of a 480 neutral oil was added 0.2 cc. of a solution having 3,160 p.p.m. of copper, 2,670 p.p.m. of iron, 160 p.p.m. of manganese, 36,700 p.p.m. of lead and 1,631 p.p.m. of tin, all as their naphthenates, providing a distribution of metals which would be expected to be found in used crankcase oils after an L–4 Chevrolet engine test. The oil sample to be tested is maintained at 340° F., and the time required to absorb 250 ml. of oxygen is observed. The results are reported as if a 100 g. sample is used and 1 liter of oxygen absorbed.

L–38 Strip Test.—In order to demonstrate the significant decrease in copper and lead corrosion, a clean strip of the candidate metal 1″ x 3″ x 1/36″ thickness is immersed in 300 ml. of a 480 neutral oil and held in the oil at 340° F. for 20 hours, while the oil is stirred with a stirrer, rotating at 800 r.p.m. The strip is then removed, washed with hexanes, allowed to dry and weighed. The loss in weight is determined and reported.

Falex Extreme Pressure Test.—A steel vertical shaft is rotated between 2 screw loaded steel jaws at room temperature, the shaft turning at a speed of 290 r.p.m. Approximately 55 cc. of the candidate oil is used to lubricate the shaft. The load is increased until failure and the load at failure reported.

TABLE I

| Ex.[1] | Wt. Percent[2] | Other Additives[3] | Wt. Percent[2] | Oxidator "B" Test; hrs., one l., O₂ | L-38 Strip Test—Loss, mg. | | Falex, E.P. Shear, lbs. |
|---|---|---|---|---|---|---|---|
| | | | | | Cu | Pb | |
| III | 5 | | | 0.45 | | | |
| IV | 5 | | | 8.9 | | | |
| V | 5 | | | 8.65 | | | |
| | | | | 8.7 | | | |
| IIIa | 5 | A | 5 | 0.5 | 11 | 660 | |
| IIIb | 5 | A | 5 | 6.0 | 30 | 3 | |
| | | A | 5 | 6.8 | 15 | 12 | |
| | | A | 5 | 0.5 | 4.9 | 747 | 920 |
| Va | 5 | A | 5 | 5.0 | 12 | 6.5 | 1,580 |
| | | B | 5 | 0.6 | 98 | 34 | 785 |
| Vb | 5 | B | 5 | 6.05 | 24 | 4.2 | 1,470 |

[1] The examples are different preparations following the procedure of Example II, except as indicated:
  III. Polyisobutylene trithione of about 550 molecular weight.
  IV. Polyisobutylene trithione of about 725 molecular weight.
  V. Polyisobutylene trithione of about 1,100 molecular weight.
  IIIa. Different preparation of III, and product extracted with aqueous ethanol.
  IIIb. Different preparation of III, and product air blown for 24 hours.
  Va. Different preparation of V.
  Vb. Different preparation of V.
[2] Wt. percent of total composition in a 480 neutral base oil.
[3] A = Polyisobutenyl succinimide of tetraethylene pentamine lubricating oil detergent.
  B = Lubricating oil detergent obtained by reacting ethylene diamine with polyisobutenyl trithione of about 1,100 mol. wt. See app. Ser. No. 541,090, filed April 8, 1966.

In order to demonstrate the effectiveness of the compositions of this invention as detergents, and in combination with detergents, as oxidation inhibitors, the compositions were tested under the Caterpillar 1–G test (MIL–L–45199). To a Mid-Continent SAE 30 oil was added the detergent in the amounts indicated and zinc O,O-di(alkylphenyl) phosphorodithioate (the alkyl is polypropylene of an average of 14 carbon atoms) or the trithionephosphite reaction product as the inhibitor. The test was carried out for 60 hours. The following results were obtained.

TABLE II

| Example[1] | Wt. percent[2] | Other Additive[3] | Amount | Groove Deposits[4] | Land Deposits[5] | Underhead[6] |
|---|---|---|---|---|---|---|
| Vc | 5 | C | 12 mM./kg | 37-8-0-0 | 305-0-0 | 8.7 |
| IIIc | 4 | A | 3.5 wt. percent[2] | 25-5-0-0 | 225-0-0 | 8.0 |
| | | | | 93-15-5-3 | 500-800-370 | 1.0 |

[1] See Table I for description; [3] indicates different preparation of composition.
[2] Wt. percent of total composition in a Mid-Continent SAE 30 oil.
[3] A = Polyisobutenyl succinimide of tetraethylene pentamine lubricating oil detergent.
  C = Zn dipolypropenylphenyl phosphorodithioate.
[4] Rated on a basis of 0 to 100, 100 being completely filled.
[5] Rated on a basis of 0 to 800, 800 being completely black.
[6] Rated on a basis of 0 to 10, 10 being completely clean.

It is evident from the reported data that the compositions of this invention function in a variety of ways in combination with other lubricating oil additives. The compositions are exceptionally good antioxidants by themselves and when used in combination with lubricating oil detergents. They function by themselves as detergents under the harsh conditions of diesel engine operation. Also, they provide extreme pressure properties to lubricants, as well as anticorrosive protection for copper and lead, as well as other metals e.g., silver.

For antioxidant and extreme pressure properties, the lower molecular weight reaction products will be used. That is, ordinarily, the reaction product of a trithione of from about 3 to 30 carbon atoms will be used. For the detergents, the reaction product of the phosphite and the trithione will employ a trithione of from about 25 to 200 carbon atoms, while for antioxidant activity used in conjunction with another detergent, the trithione employed for the reaction product will generally be in the range of about 15 to 100 carbon atoms.

The preferred trithione reactants providing both detergency and antioxidant activity in the reaction product are those of from 25 to 100 carbon atoms, particularly those having a polyisobutylene chain of from about 20 to 90 carbon atoms substituted on the ring.

The antioxidant activity of the compositions of this invention can be employed in the protection of polymers, greases, automatic transmission fluids, gear lubricants, fuels, etc. The compositions may also be used to enhance cetane number in diesel fuels.

As will be evident to those skilled in the art, various modifications on this invention can be made or followed, in the light of the foregoing disclosure and discussion, without departing from the spirit or scope of the disclosure or from the scope of the following claims.

I claim:

1. A composition of matter obtained by reacting a trithione of the formula:

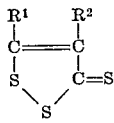

wherein $R^1$ and $R^2$ are hydrogen or hydrocarbyl having a total of from 1 to 199 carbon atoms with at least 2 moles of a phosphite ester per mole of trithione at a temperature of at least 50° C.

2. A composition according to claim 1, wherein the thionophosphate is removed from the reaction product.

3. A composition according to claim 1, wherein one of $R^1$ and $R^2$ is polyisobutenyl and said phosphite ester is a tri-lower alkyl phosphite.

4. A composition according to claim 1, wherein the temperature for the reaction is in the range of about 75° to 180° C.

5. A composition according to claim 1, wherein said phosphite ester is present in from about 3 to 8 moles per mole of trithione.

6. A composition according to claim 1, wherein $R^1$ and $R^2$ have a total of from 1 to 27 carbon atoms.

7. A composition according to claim 1, wherein $R^1$ and $R^2$ have a total of from 25 to 150 carbon atoms.

8. A lubricating oil composition having in an amount sufficient to provide antioxidant properties, extreme pressure properties or detergency, a composition according to claim 1.

9. A compound of the formula:

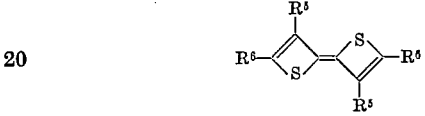

wherein $R^5$ and $R^6$ are hydrogen or hydrocarbyl having a total of from 1 to 199 carbon atoms.

10. A composition according to claim 9, wherein one of $R^5$ and $R^6$ is tert.-butyl and the other is neopentyl.

References Cited

UNITED STATES PATENTS

| | | | |
|---|---|---|---|
| 2,816,075 | 12/1957 | Fields | 252—45 |
| 2,995,569 | 8/1961 | Hamilton et al. | 252—45 XR |

DANIEL E. WYMAN, *Primary Examiner.*

W. H. CANNON, *Assistant Examiner.*

U.S. Cl. X.R.

252—45; 260—327